US007950740B2

(12) United States Patent
Bunea et al.

(10) Patent No.: US 7,950,740 B2
(45) Date of Patent: May 31, 2011

(54) SEAT SWIVEL WITH BRAKE FOR INFINITE ROTATIONAL POSITION ADJUSTMENT

(75) Inventors: Catalin Bunea, Fort Lauderdale, FL (US); Daniel I. Udriste, Weston, FL (US)

(73) Assignee: B/E Aerospace, Inc., Wellington, FL (US)

( * ) Notice: Subject to any disclaimer, the term of this patent is extended or adjusted under 35 U.S.C. 154(b) by 273 days.

(21) Appl. No.: 12/256,549

(22) Filed: Oct. 23, 2008

(65) Prior Publication Data

US 2010/0102611 A1 Apr. 29, 2010

(51) Int. Cl.
*A47C 1/00* (2006.01)

(52) U.S. Cl. ............................... 297/344.23; 297/344.21

(58) Field of Classification Search ............. 297/344.21, 297/344.22, 344.23
See application file for complete search history.

(56) References Cited

U.S. PATENT DOCUMENTS

| 4,705,256 | A | * | 11/1987 | Hofrichter | 248/418 |
|---|---|---|---|---|---|
| 4,969,685 | A | | 11/1990 | Chihaya et al. | |
| 4,971,392 | A | * | 11/1990 | Young | 297/256.12 |
| 5,568,960 | A | * | 10/1996 | Oleson et al. | 297/344.22 |
| 5,599,065 | A | * | 2/1997 | Gryp et al. | 297/344.22 |
| 5,941,498 | A | * | 8/1999 | Hoshihara et al. | 248/550 |
| 5,951,106 | A | * | 9/1999 | Hirama et al. | 297/344.22 |
| 6,021,989 | A | * | 2/2000 | Morita et al. | 248/349.1 |
| 6,575,420 | B2 | * | 6/2003 | Yoshida et al. | 248/425 |
| 6,722,737 | B2 | * | 4/2004 | Kanai | 297/344.22 |
| 2003/0025377 | A1 | | 2/2003 | Peters | |
| 2006/0108848 | A1 | | 5/2006 | Williamson et al. | |

* cited by examiner

*Primary Examiner* — Sarah B McPartlin
(74) *Attorney, Agent, or Firm* — Drinker Biddle & Reath LLP

(57) ABSTRACT

A seat swivel for providing angular adjustment of a seat to an infinite number of rotational positions with respect to a seat base. The seat swivel includes a swivel assembly having a swivel plate rotatably supported between a pair of fixed plates, the swivel plate being adapted to be affixed to the seat and the fixed plates being adapted to be affixed to a seat base. The seat swivel further includes a brake assembly having a mechanism for releasably retaining the seat in any one of the infinite number of positions when the seat is subjected to a first dynamic impact loading, the mechanism being either mechanically or electrically actuated, the mechanism being adapted to withstand a dynamic impact loading of up to about 16 g in at least one rotational position of the seat.

16 Claims, 5 Drawing Sheets

SEAT SWIVEL WITH BRAKE FOR INFINITE ROTATIONAL POSITION ADJUSTMENT

FIELD OF THE INVENTION

This invention pertains to a method and apparatus for adjusting and maintaining the rotational position of a swiveling seat.

BACKGROUND OF THE INVENTION

Aircraft seats, particularly in private and executive jets but also in commercial jets, commonly are rotatable to a plurality of angular positions to provide additional comfort for a passenger. Existing swivel assemblies typically utilize an angular thrust roller bearing to support the seat and to provide for rotational movement, and include a multi-point brake that allows a seat to be repositioned and fixed in a discrete number of predetermined positions. As a result of the limited angular position capabilities of such a seat, a passenger may not be able to achieve optimal comfort because an angular position between two of the predetermined positions is unavailable.

Additionally, the tolerances required in angular thrust bearing seat swivels necessitates additional manufacturing operations to control the play in the seat assembly, particularly along the vertical axis. Additional thrust bearings are sometimes added in attempt to address this problem, with the concomitant disadvantage of additional weight and cost.

Aircraft seats are required to comply with applicable Federal Aviation Administration (FAA) regulations. In particular, a seat swivel is required under 14 C.F.R. §25 (more specifically subsection 25.562) to be able to withstand a dynamic impact loading of up to 16 g, as defined in the pertinent regulations. Therefore, any design for an improved seat swivel with brake that provides for infinite position adjustment would have to meet those, and any other, applicable FAA requirements.

BRIEF SUMMARY OF THE INVENTION

In one embodiment, the invention provides a seat swivel for providing angular adjustment of a seat to an infinite number of rotational positions with respect to a seat base. The seat swivel includes a swivel assembly having a swivel plate rotatably supported on guiding roller bearings between a pair of fixed plates. The swivel plate is adapted to be affixed to the seat and the fixed plates are adapted to be affixed to a seat base. The seat swivel further includes a brake assembly having a mechanism for releasably retaining the seat in any one of the infinite number of positions when the seat is subjected to a first dynamic impact loading.

In another embodiment, the invention provides a seat swivel for providing angular adjustment of a seat to an infinite number of rotational positions with respect to a seat base. The seat swivel includes a swivel assembly having a swivel plate rotatably supported between a pair of fixed plates. The swivel plate is adapted to be affixed to the seat and the fixed plates are adapted to be affixed to a seat base. The seat swivel further includes a brake assembly having means for releasably retaining the seat in any one of the infinite number of positions when the seat is subjected to a dynamic impact loading of up to about 4 g and means for releasably retaining the seat in at least one predetermined position when the seat is subjected to a dynamic impact loading of up to about 16 g.

DETAILED DESCRIPTION OF THE INVENTION

The following examples further illustrate the invention but, of course, should not be construed as in any way limiting its scope.

Figure 1:
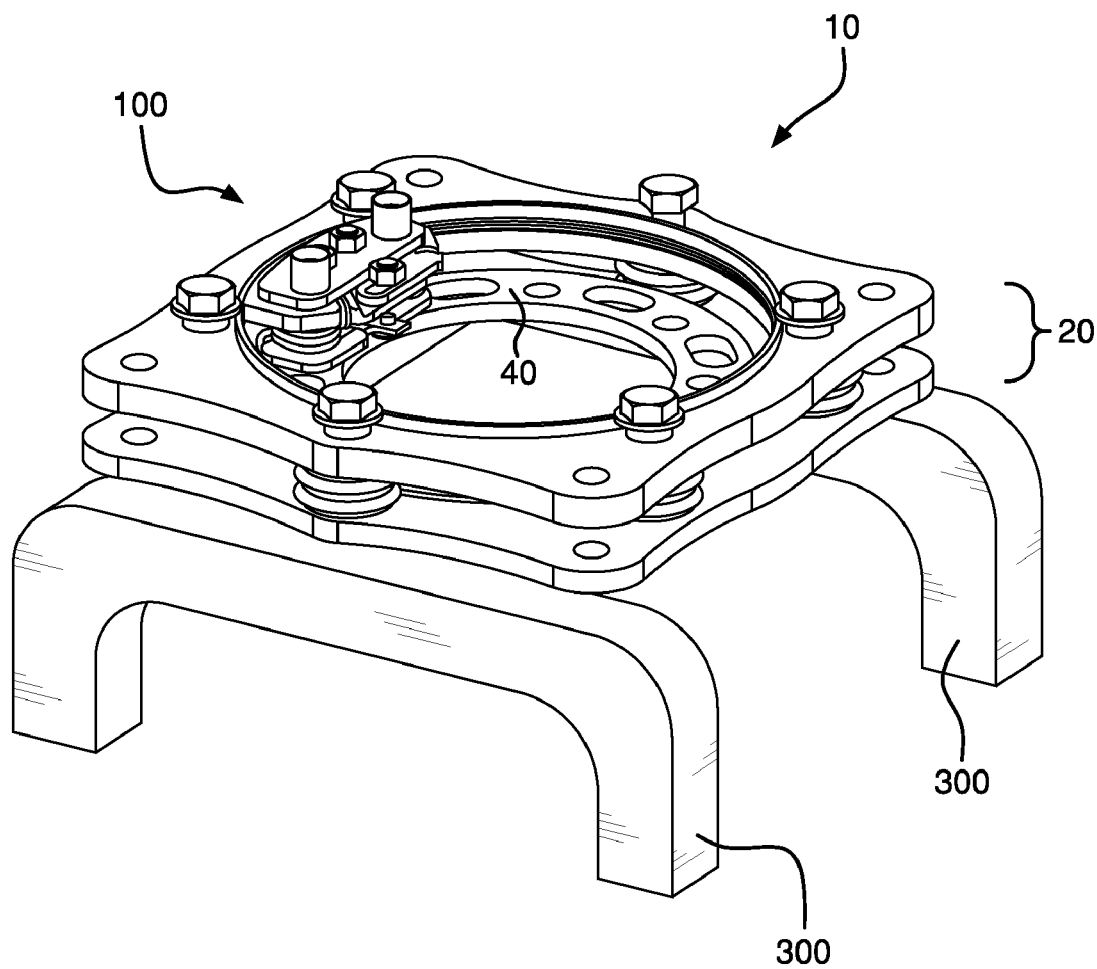
FIG. 1 is a perspective view of an embodiment of a seat swivel with a mechanical brake assembly mounted to a seat base.

There is shown in FIG. 1 an embodiment of a seat swivel 10 for providing angular adjustment to the rotational position of a seat (not shown). The seat swivel 10 is shown mounted to a seat base 300. The seat swivel 10 includes a pair of fixed plates 20 comprising a lower fixed plate 22 and an upper fixed plate 24. The seat swivel 10 further includes a swivel plate 40 and a brake assembly 100. The pair of fixed plates 20 is adapted to be affixed to the seat base 300, and the swivel plate 40 is adapted to be affixed to the seat.

Figure 2:
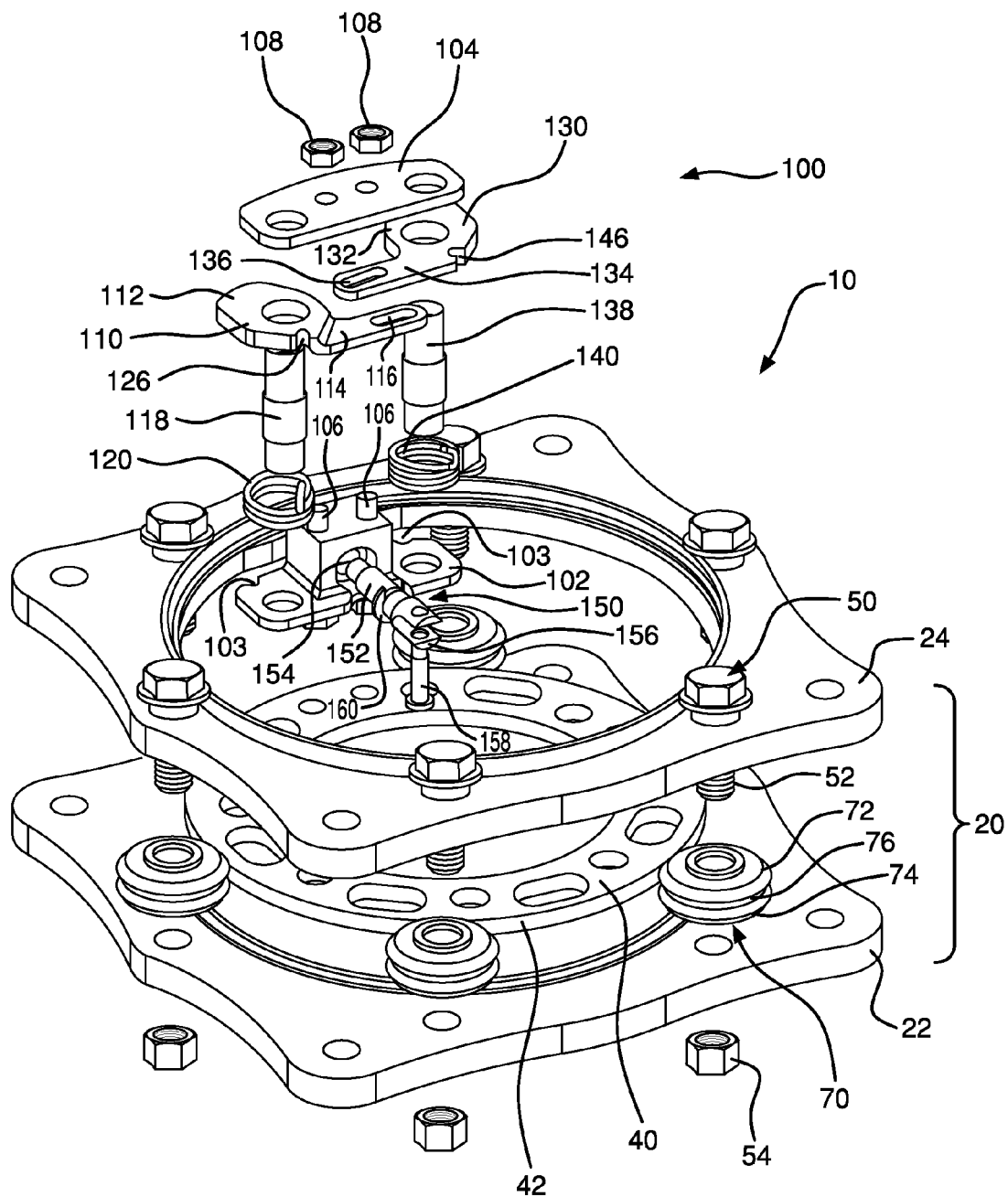
FIG. 2 is an exploded perspective view of the seat swivel with a brake assembly as in FIG. 1.
Figure 3:
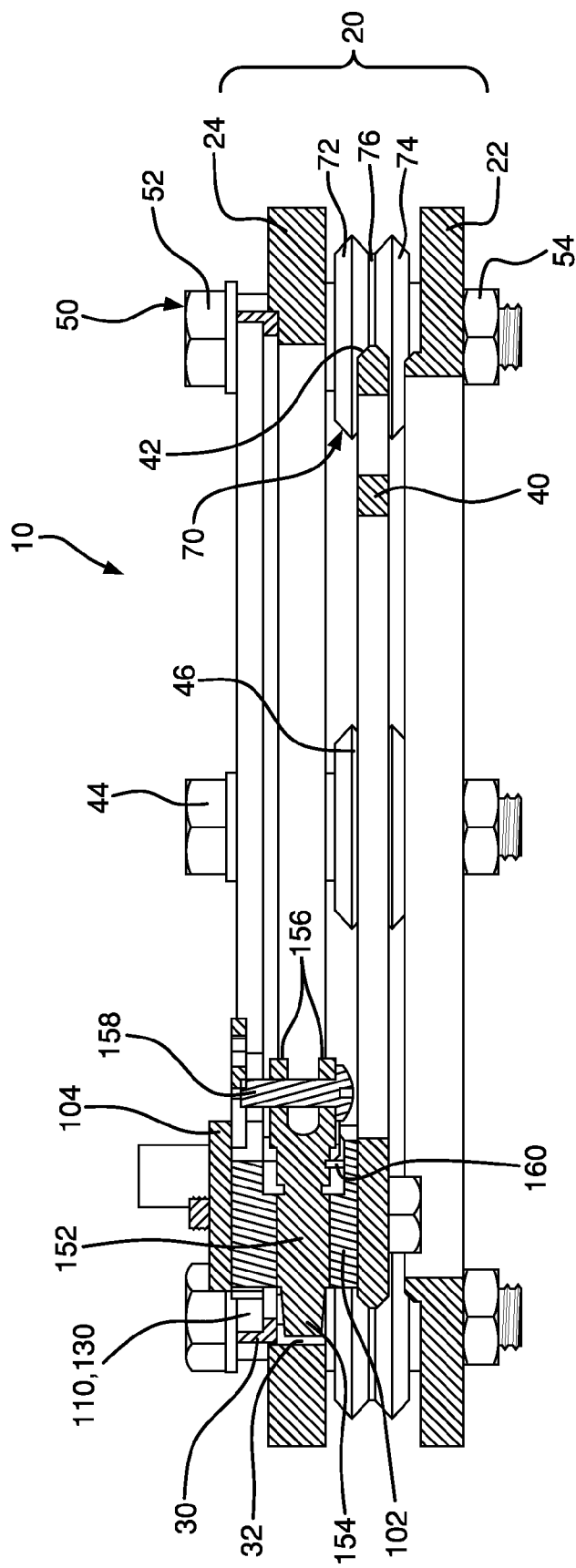
FIG. 3 is a cross-sectional view of the seat swivel with the brake assembly of FIG. 2.

The seat swivel 10 and brake assembly 100 can be understood in greater detail with reference to FIGS. 2 and 3. The swivel plate 40 is disposed between the upper fixed plate 24 and the lower fixed plate 22, and is rotatably supported and guided by a plurality of guiding roller bearings 70. The swivel plate 40 can rotate in either direction a full 360° with respect to the pair of fixed plates 20. The brake assembly 100 is adapted to infinitely position the seat, which will maximize passenger comfort by allowing the seat to be locked in any desired angular position along the rotational travel range. As shown in FIG. 3, a fastener 44 and bushing 46 can be used to secure the seat to the swivel plate 40.

In the depicted embodiment, a quantity of six guiding roller bearings 70 is shown, it being understood that the number of roller bearings 70 can be adjusted as appropriate to accommodate the size of the swivel plate 40 and the loading to which the seat swivel 10 will be subjected. While it is anticipated that at least three guiding roller bearings 70 are required, there is no theoretical upper limit on the number of roller bearings 70 within the physical space restraints of the seat swivel 10. In addition, other equivalent mechanisms for rotatably supporting the swivel plate 40 between the pair of fixed plates 20 can be provided by one of skill in the art.

Each of the roller bearings 70 is supported to be rotatable about its own axis with respect to the pair of fixed plates 20. A plurality of fasteners 50 secure the lower fixed plate 22 and the upper fixed plate 24 together. As depicted, each fastener 50 includes a mating bolt 52 and nut 54 and serves as an axle of rotation for a corresponding one of the roller bearings 70. Alternatively, the roller bearings 70 can be supported on axles separate from the fasteners 50 holding the pair of fixed plates 20 together.

The guiding roller bearings 70 provide a significant improvement over angular thrust bearings that are typically used in the prior art to provide for lateral support and rotational movement of the seat. Each guiding roller bearing 70 includes an upper ridge 72 and a lower ridge 74 bounding a tapered channel 76. The tapered channel 76 is shaped to receive a mating tapered outer circumferential edge 42 of the swivel plate. As a result, the guiding roller bearings 70 snugly receive the swivel plate 40. A snug fit between the guiding roller bearings 70 and the swivel plate 40, in combination with the rigid support provided to the roller bearings 70 mounted between the pair of fixed plates 20, significantly minimizes play of the seat in all directions, particularly along the vertical axis, when compared with prior art seat swivels that employ angular thrust bearings.

The guiding roller bearings 70 allow the seat to swivel with a motion that is more consistent than that provided by prior designs. Additionally, the use of the guiding roller bearings 70, as described herein, simplifies the manufacturing assembly process by allowing the seat swivel 10 to be stamped and riveted in place in a short amount of time, reduces weight and cost, improves reliability and repeatability of operation, and reduces the time needed for quality control inspection.

The brake assembly 100 is mounted to the swivel plate 40 such that the brake assembly 100 rotates with respect to the pair of fixed plates 20 when the swivel plate 40 is rotated. The brake assembly 100 comprises two unidirectional eccentric cams, a first eccentric cam 110 and a second eccentric cam 130, adapted to retractably engage a brake ring 30 disposed on an inner circumferential portion of the upper fixed plate 24. It is understood that the brake assembly 100 could be designed to function equally well if the brake ring 30 were disposed on an inner circumferential portion of the lower fixed plate 22.

The first eccentric cam 110 is pivotably supported on a shank 118 and the second eccentric cam 130 is pivotably supported on a shank 138. The shank 118 and the shank 138 are supported below by a bottom bracket 102 and above by a top bracket 104, the brackets 102 and 104 being held together by a pair of bolts 106 and mating nuts 108.

The first eccentric cam 110 includes a lobe 112 (partially obscured) for frictionally contacting the brake ring 30, an arm 114 for providing leverage to actuate the lobe 112, a slot 116 in the arm 114, and a notch 126 for receiving an end of a torsional spring 120. An opposite end of the torsional spring 120 is seated against the bottom bracket 102 in a notch 103. The spring 120 biases the first eccentric cam 110 in an engaged position such that the lobe 112 is forceably frictionally engaged with the brake ring 30. The geometry of the cam lobe 112 and the strength of the torsional spring 120 are determined, in part, based on the frictional properties of the material from which the brake ring 30 is made.

The second eccentric cam 130 includes a lobe 132 for frictionally contacting the brake ring 30, an arm 134 for providing leverage to actuate the lobe 132, a slot 136 in the arm 134, and a notch 146 for receiving an end of a torsional spring 140. An opposite end of the torsional spring 140 is seated against the bottom bracket 102 in a notch 103. The spring 140 biases the second eccentric cam 130 in an engaged position such that the lobe 132 is forceably frictionally engaged with the brake ring 30. The geometry of the cam lobe 132 and the strength of the torsional spring 140 are determined, in part, based on the frictional properties of the material from which the brake ring 30 is made.

A locking pin assembly 150 coordinates the movement of the first eccentric cam 110 and the second eccentric cam 130 with each other. The locking pin assembly 150 includes a locking pin 152 having a first end 154 and a second forked end 156. The first end 154 of the locking pin 152 is received into an aperture 162 extending radially through the bottom bracket 102. The locking pin assembly 150 is retained in the aperture 162 via a lock ring 160 or other similar mechanism that allows the locking pin 152 to move inwardly and outwardly with respect to the aperture 162.

The first eccentric cam 110 and the second eccentric cam 130 are interconnected by a connecting rod 158 that extends through the slot 116 and the slot 136, the connecting rod 158 further extending through apertures in the forked end 156 of the locking pin 152. An exposed portion of the connecting rod 158 in the forked end 156 of the locking pin 152 is adapted to receive an external device for actuating or triggering the locking pin 152 and thereby the first and second eccentric cams 110, 130.

When the locking pin 152 is actuated radially inwardly toward the center of the swivel plate 40 (i.e., outwardly from the aperture 162), the connecting rod 158 engages the slot 116 of the eccentric cam 110 and the slot 136 of the eccentric cam 130, drawing the arm 114 and the arm 134 toward the center of the swivel plate 40 and causing the first cam lobe 112 and the second cam lobe 132 to disengage from the brake ring 30. Accordingly, when the locking pin 152 is actuated radially inwardly, the swivel plate 40 is enabled to rotate with respect to the pair of fixed rings 20, thereby enabling the seat (which moves with the swivel plate 40) to be rotatably repositioned with respect to the seat base 300 (which holds stationary the pair of fixed rings 20).

When the locking pin 152 is released from being actuated, the torsional spring 120 and the torsional spring 140 act against the first eccentric cam 110 and the second eccentric cam 130, respectively, causing the arm 114 and the arm 134 to be drawn radially outwardly away from the center of the swivel plate 40 and causing the lobe 112 and the lobe 132 to engage with the brake ring 30 to retain the seat in its present rotational position with respect to the seat base 300. The biasing force of the springs 120, 140 also causes the slots 116, 136 to act on the connecting rod 158, forcing the locking pin 152 radially outwardly (i.e., inwardly into the aperture 162 in the bottom bracket 102). For any of the infinite possible rotational positions of the seat with respect to the seat base 300 (i.e., for any of the infinite possible rotational positions of the swivel plate 40 with respect to the pair of fixed plates 20), the lobes 112, 132 of the respective eccentric cams 110, 130 are adapted to engage the brake ring 30 to retain the seat in its present position. Preferably, the engagement force of the lobes 112, 132 against the brake ring 30, based on the strength of the torsional springs 120, 140, is sufficient to prevent the seat from rotating when subjected to dynamic impact loading or force up to about 4 g.

In one embodiment of the seat swivel 10, the upper fixed ring 24 comprises at least one notch 32 adapted to receive the first end 154 of the locking pin 152. Accordingly, in at least one rotational position of the seat with respect to the seat base 300, the locking pin 152 engages the upper fixed ring 24 via the notch 32 to provide additional resistance to rotation beyond that provided by the engagement of the cam lobes 112, 132 with the brake ring 30. In particular, when the seat is in a position such that the aperture 162 in the bottom bracket 102 is substantially aligned with the notch 32, and when the locking pin 152 is released from being actuated, the springs 120, 140 act to force the locking pin 152 sufficiently through the aperture 162 that the first end 154 of the pin 152 is received into the notch 32 and is thereby receivably engaged by the upper fixed ring 24. Preferably, the combination of the pin 152 being received into the notch 32 of the upper fixed ring 24 and the frictional engagement between the eccentric cams 110, 130 and the brake ring 30 provides sufficient resistance to prevent the seat from rotating when subjected to a dynamic impact loading or force up to about 16 g, to achieve compliance with FAA safety requirements.

It is understood that the upper fixed ring 24 can include more than one notch 32, the interaction of the pin 152 with each notch 32 being substantially identical. It is also understood the seat swivel 10 could be arranged such that the pin 152 would be receivably engaged with one or more such notches 32 disposed in the lower fixed ring 22.

When the seat is rotationally positioned such that the aperture 162 is not substantially aligned with the notch 32 (or with one of the notches 32, in the event that there are more than one notch 32 in the upper fixed plate 24), the locking pin 152 is caused to come to rest against a portion of the inner circumference of the upper fixed ring 24, but does not provide substantial additional resistance to rotation of the seat.

In one embodiment, when the locking pin 152 is triggered toward the center of the swivel plate 40, the eccentric cams 110, 130 first release from the brake ring 30 and the locking pin 152 then disengages from the notch 32. After swivel rotation to a desired seat position in which the aperture 162 is not substantially aligned with the notch 32, when the locking pin 152 is released the springs 120, 140 cause the end 154 of the locking pin 152 to first rest against an inner circumferential portion of the upper fixed ring 24 and then the slots 116, 136 in the eccentric cams 110, 130 permit the cam lobes 112, 132 to engage the brake ring 30 to hold the swivel plate 40 (and thus the seat) from rotating. When the locking pin 152 is engaged in the notch 32, the seat can preferably resist a dynamic impact loading of up to about 16 g without changing rotational position. When the locking pin 152 is not engaged in the notch 32 but the eccentric cams 110, 130 are engaged with the brake ring 30, the seat can preferably resist a dynamic impact loading of up to about 4 g without changing rotational position.

Figure 4:
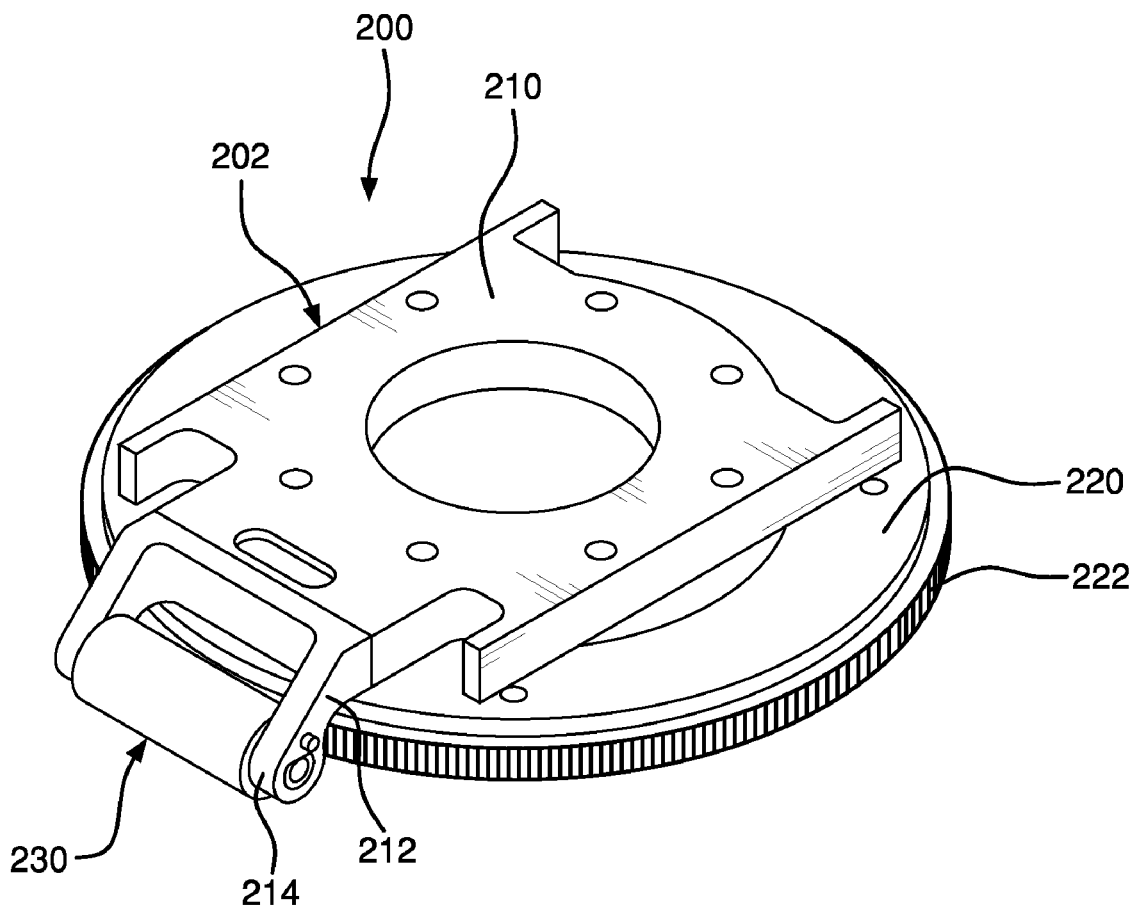
FIG. 4 is a perspective view of a portion of an embodiment of an electrically actuated brake assembly for use in a seat swivel.
Figure 5:
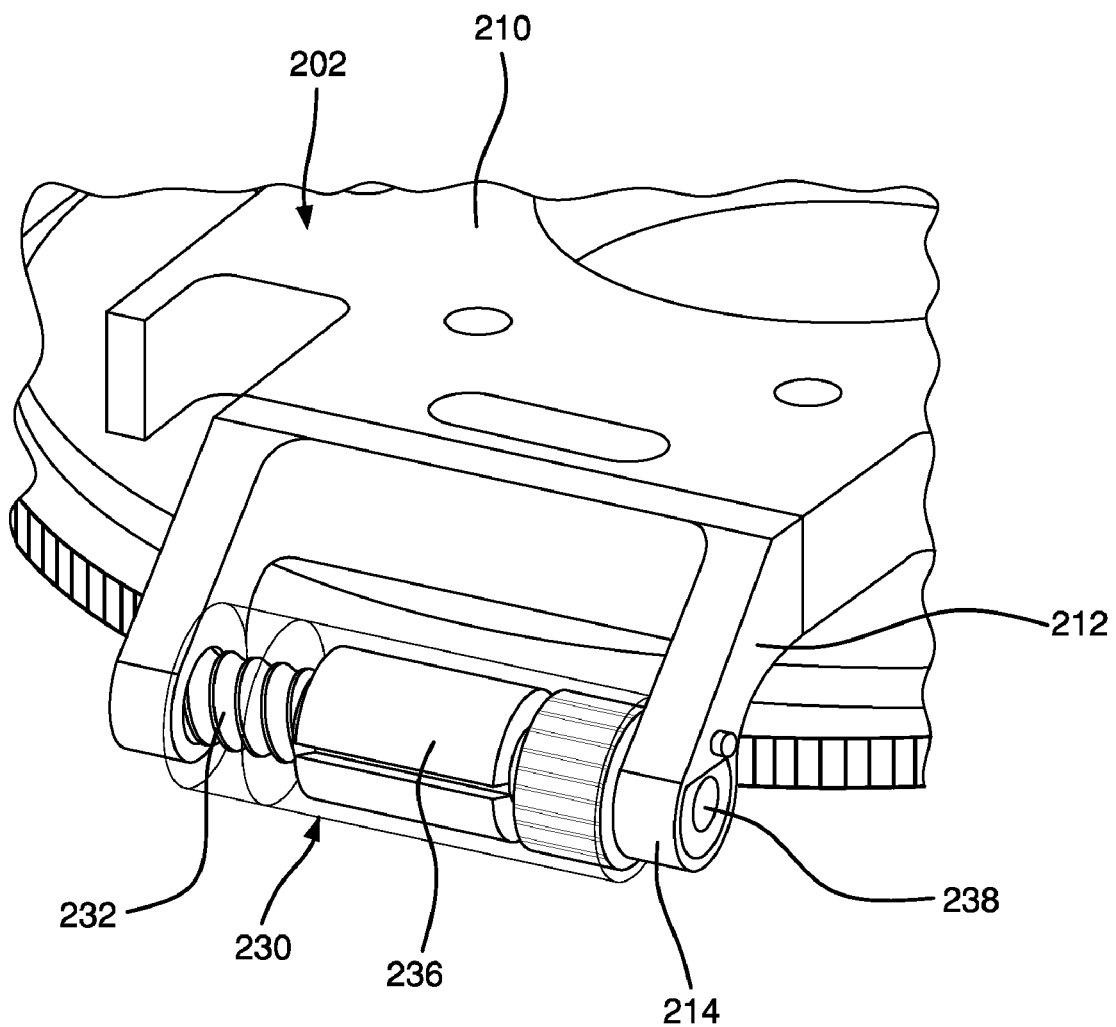
FIG. 5 is a partial expanded perspective view of the portion of the brake assembly of FIG. 4.

There is shown in FIG. 4 an embodiment of a brake assembly 200 adapted for use with a seat swivel 10. An expanded portion of the brake assembly 200 is shown in FIG. 5. The brake assembly 200 includes a fixed rim gear 220 disposed between the pair of fixed plates 20 and secured thereto. The fixed rim gear 220 remains stationary with the seat base 300 and the pair of fixed plates 20. Gear teeth 222 are disposed on the outer circumference of the fixed ring gear 220. The gear teeth 222 are preferably closely spaced to allow for fine adjustment of the angular position of the seat.

The brake assembly 200 further includes a drive assembly 202. The drive assembly 202 includes a mounting bracket 210 having journal arms 212, the journal arms carrying journals 214 for rotatably supporting a worm gear assembly 230. The drive assembly 202 is affixed to the swivel plate 40, enabling the drive assembly 202 to rotate in conjunction with the seat. The worm gear assembly 230 is rotatable on bearings 238, each bearing 238 being supported in a respective journal 214. The worm gear assembly 230 includes a worm gear 232, an electric motor 236 for automatically rotating the worm gear 232. The electric motor 236 receives power via an electrical harness 216. The worm gear 232 can rotate and stop anywhere, to provide infinite angular adjustment of the rotational position of the seat relative to the seat base 300.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A seat swivel for providing angular adjustment of a seat to an infinite number of rotational positions with respect to a seat base, comprising:
    a swivel assembly having a swivel plate rotatably supported between a pair of fixed plates by a plurality of guiding roller bearings, wherein each guiding roller bearing includes a tapered channel adapted to receive a corresponding tapered outer circumferential edge of the swivel plate, the swivel plate being adapted to be affixed to the seat and the fixed plates being adapted to be affixed to a seat base; and
    a brake assembly having a mechanism for releasably retaining the seat in any one of the infinite number of positions when the seat is subjected to a first dynamic impact loading.

2. The seat swivel of claim 1, wherein the first dynamic impact loading is up to about 4 g.

3. The seat swivel of claim 1, wherein the mechanism for retaining the seat is further adapted to retain the seat in at least one predetermined position when the seat is subjected to a second dynamic impact loading greater than the first dynamic impact loading.

4. The seat swivel of claim 3, wherein the first dynamic impact loading is up to about 4 g and the second dynamic impact loading is up to about 16 g.

5. The seat swivel of claim 1, wherein the brake assembly comprises:
    a rim gear secured to at least one of the fixed plates; and
    a worm gear mechanism secured to the swivel plate, the worm gear mechanism including a worm gear meshed with the rim gear and an actuator for rotating the worm gear;
    wherein when the worm gear is rotated the swivel plate is caused to rotate with respect to the fixed plates; and
    wherein when the worm gear is stationary the swivel plate is caused to remain stationary with respect to the fixed plates.

6. The seat swivel of claim 5, wherein the actuator is an electric motor.

7. The seat swivel of claim 5, wherein the worm gear mechanism is adapted to retain the seat in at least one predetermined position when the seat is subjected to a dynamic impact loading up to about 16 g.

8. A seat swivel for providing angular adjustment of a seat to an infinite number of rotational positions with respect to a seat base, comprising:
    a swivel assembly having a swivel plate rotatably supported by a pair of fixed plates, the swivel plate being adapted to be affixed to the seat and the fixed plates being adapted to be affixed to a seat base; and
    a brake assembly having a mechanism for releasably retaining the seat in any one of the infinite number of positions when the seat is subjected to a first dynamic impact loading, wherein the brake assembly comprises:
    a brake ring disposed on an inner circumferential portion of one of the fixed plates; and
    a spring loaded eccentric cam assembly comprising:
        a first eccentric cam having a lobe adapted to retractably engage the brake ring;
        a second eccentric cam having a lobe adapted to retractably engage the brake ring; and
        a pin interconnecting the first and second eccentric cams;
        wherein when the pin is actuated radially outwardly, the lobes of the first and second eccentric cams engage the brake ring; and
        wherein when the pin is actuated radially inwardly, the lobes of the first and second eccentric cams disengage from the brake ring.

9. The seat swivel of claim 8, wherein at least one of the first and second eccentric cams is spring biased to engage the brake ring, such that pin is biased radially outwardly.

10. The seat swivel of claim 8, one of the fixed plates further comprising a notch for receiving an end of the pin when the seat is in a predetermined position whereby the pin is substantially aligned with the notch.

11. A seat swivel for providing angular adjustment of a seat to an infinite number of rotational positions with respect to a seat base, comprising:

a swivel assembly having a swivel plate rotatably supported between a pair of fixed plates by a plurality of roller bearings, each guiding roller bearing including a tapered channel adapted to receive a corresponding outer circumferential edge of the swivel plate, said swivel plate being adapted to be affixed to the seat and the fixed plates being adapted to be affixed to a seat base; and a brake assembly having:
means for releasably retaining the seat in any one of the infinite number of positions when the seat is subjected to a dynamic impact loading of up to about 4 g; and
means for releasably retaining the seat in at least one predetermined position when the seat is subjected to a dynamic impact loading of up to about 16 g.

12. The seat swivel of claim 11, wherein the means for releasably retaining the seat comprise:
a rim gear secured to at least one of the fixed plates; and
a worm gear mechanism secured to the swivel plate, the worm gear mechanism including a worm gear meshed with the rim gear and an actuator for rotating the worm gear;
wherein when the worm gear is rotated the swivel plate is caused to rotate with respect to the fixed plates; and
wherein when the worm gear is stationary the swivel plate is caused to remain stationary with respect to the fixed plates when the seat is subjected to a dynamic impact loading of up to about 16 g.

13. The seat swivel of claim 12, wherein the actuator is an electric motor.

14. A seat swivel for providing angular adjustment of a seat to an infinite number of rotational positions with respect to a seat base, comprising:

a swivel assembly having a swivel plate rotatably supported between a pair of fixed plates, the swivel plate being adapted to be affixed to the seat and the fixed plates being adapted to be affixed to a seat base; and a brake assembly having:
means for releasably retaining the seat in any one of the infinite number of positions when the seat is subjected to a dynamic impact loading of up to about 4 g; and
means for releasably retaining the seat in at least one predetermined position when the seat is subjected to a dynamic impact loading of up to about 16 g, wherein the means for releasably retaining the seat in any one of the infinite number of positions comprises:
a brake ring disposed on an inner circumferential portion one of the fixed plates; and
a spring loaded eccentric cam assembly comprising:
a first eccentric cam having a lobe adapted to retractably engage the brake ring;
a second eccentric cam having a lobe adapted to retractably engage the brake ring; and
a pin interconnecting the first and second eccentric cams;
wherein when the pin is actuated radially outwardly, the lobes of the first and second eccentric cams engage the brake ring; and
wherein when the pin is actuated radially inwardly, the lobes of the first and second eccentric cams disengage from the brake ring.

15. The seat swivel of claim 14, wherein the means for retaining the seat in at least one predetermined position comprises a notch disposed in one of the fixed plates for receiving an end of the pin when the seat is in the at least one predetermined position.

16. The seat swivel of claim 14, wherein at least one of the first and second eccentric cams is spring biased to engage the brake ring, such that pin is biased to the latched position.

* * * * *